United States Patent [19]

Söllner et al.

[11] Patent Number: 5,506,837
[45] Date of Patent: Apr. 9, 1996

[54] CELLULAR RADIO COMMUNICATION SYSTEM WHICH IS SELECTIVELY CONVERTIBLE INTO A TRUNKED RADIO COMMUNICATION SYSTEM FOR GROUP CALLS

[75] Inventors: Michael Söllner, Erlangen; Alfons Eizenhöfer, Altdorf, both of Germany

[73] Assignee: U.S. Philips Corporation, New York, N.Y.

[21] Appl. No.: 197,526

[22] Filed: Feb. 10, 1994

[30] Foreign Application Priority Data

Feb. 11, 1993 [DE] Germany ............................ 43 04 095.0

[51] Int. Cl.$^6$ ................................ H04B 7/26; H04L 5/16; H04Q 7/00
[52] U.S. Cl. ................ 370/31; 370/95.1; 370/110.1; 379/60; 379/63; 455/33.2; 455/33.4; 455/54.2; 455/56.1; 340/825.47
[58] Field of Search ................... 370/24, 29, 31, 370/77, 79, 85.2, 85.3, 85.7, 85.13, 95.1, 95.3, 110.1; 379/58, 59, 60, 61, 63; 455/15, 16, 33.1, 33.2, 33.4, 34.1, 34.2, 53.1, 54.1, 54.2, 56.1, 67.1, 68, 69; 340/825.03, 825.04, 825.06, 825.44, 825.47, 825.5, 825.51

[56] References Cited

U.S. PATENT DOCUMENTS

| | | | |
|---|---|---|---|
| 3,898,390 | 8/1975 | Wells et al. ............................ | 379/59 |
| 4,646,345 | 2/1987 | Zdunek et al. ........................ | 455/34.1 |
| 5,042,082 | 8/1991 | Dahlin ................................... | 455/33.2 |
| 5,095,529 | 3/1992 | Comroe et al. ........................ | 455/56.1 |
| 5,117,423 | 5/1992 | Shepherd et al. ..................... | 370/95.1 |
| 5,218,716 | 6/1993 | Comroe et al. ........................ | 455/33.4 |
| 5,231,635 | 7/1993 | Travers et al. ........................ | 370/95.1 |
| 5,239,674 | 8/1993 | Comroe et al. ........................ | 455/33.1 |
| 5,239,676 | 8/1993 | Strawczynski et al. ............... | 455/33.2 |
| 5,239,682 | 8/1993 | Strawczynski et al. ............... | 455/54.1 |
| 5,313,654 | 5/1994 | Comroe et al. ........................ | 455/33.1 |

FOREIGN PATENT DOCUMENTS

| | | |
|---|---|---|
| 0544457 | 6/1993 | European Pat. Off. . |
| 8603635 | 6/1986 | WIPO . |
| 9208300 | 5/1992 | WIPO . |
| 9208326 | 5/1992 | WIPO . |

OTHER PUBLICATIONS

M. Coudreuse et al, "Mobile Trunked Radiocommunications Systems TN 10–TN 100–TN 200", TRT communication and transmission, No. 2, 1989, pp. 39–50.

B. Fino et al, "Radiocommunications With Mobile Subscribers", TRT communication & transmission, No. 1, 1987, pp. 41–54.

*Primary Examiner*—Alpus H. Hsu
*Attorney, Agent, or Firm*—Michael E. Schmitt

[57] ABSTRACT

Cellular mobile radio systems provide full-duplex communication between base stations and mobile stations and with the fixed public service network. Also known are trunked mobile radio systems wherein a group of mobile users can exchange information with each other in the half-duplex mode over a common channel, only one user transmitting to the others at any time. It has been proposed to provide mobile radio sets which are especially adapted to be switched for use in either of such systems. The present invention avoids the need for specific adaptation of a mobile radio set for that purpose. Instead, it enables a cellular mobile radio system to be selectively converted into a trunked mobile radio system by providing for the base station to couple an up-link radio channel of any mobile user to down-link radio channels of a selected group of mobile users. One or more such user groups can be formed, only one radio channel being used for each group.

14 Claims, 4 Drawing Sheets

CELLULAR RADIO COMMUNICATION SYSTEM WHICH IS SELECTIVELY CONVERTIBLE INTO A TRUNKED RADIO COMMUNICATION SYSTEM FOR GROUP CALLS

BACKGROUND OF THE INVENTION

1. Field of the Invention

The invention relates to a communication system comprising base stations and mobile stations for communication among mobile stations and/or among mobile stations and wire-bound subscribers, in which system a plurality of radio channels in the direction from mobile station to base station (uplink radio channels) and a plurality of radio channels in the direction from base station to mobile station (downlink radio channels) are assigned to each other in pairs as duplex radio channels, and in which for seizing a duplex radio channel or for a shift to a trunked mobile radio system signalling takes place between base station and mobile station over at least one control channel.

2. Description of the Related Art

Mobile radio systems for covering a rather large coverage area have been designed as cellular radio networks for a long time. In each cell of such a radio network there is at least one stationary base transceiver station which maintains the radio connection in the full-duplex mode with the mobile stations located in its radio cell. By means of signalling methods on a control channel it is ensured that never more than one mobile user at a time occupies a full-duplex radio channel.

For closed user groups there are also what is commonly referred to as trunked mobile radio systems in which, in the half-duplex mode, the individual users all access one radio channel. Access to this radio channel is ensured by suitable signalling methods by which in the case of group calls, only one user at a time of a group of users is in a position to speak, but users in the same user group can hear him/her. Such trunked mobile radio systems are highly frequency-efficient, because a group of users need to have only a single radio channel due to the half-duplex mode.

Mobile radio systems and trunked mobile radio systems are radio systems operating in mutually different frequency bands and also having different geographical areas. For example, trunked mobile radio systems used in Germany nowadays are even regionally restricted to specific large cities and their neighbouring areas.

WO 92/08326 has disclosed a method by which it is possible with only one radio receiver to take part in both a mobile radio system and a trunked mobile radio system, while a shift between the two systems can be made as desired. For this purpose, different access numbers are used on the control channels monitored by the mobile stations, from which numbers a mobile station can distinguish in which of the two systems a call for that mobile station is being received, and if in the trunked mobile radio system whether a group call to its own user group is being made.

SUMMARY OF THE INVENTION

It is an object of the invention to provide a cellular mobile radio system which can readily be operated as a trunked mobile radio system, thereby making more efficient use of the assigned frequency channels.

This object is achieved by enabling an uplink radio channel and/or a wire-bound subscriber to be coupled to at least one downlink radio channel of the cellular system.

The coupling of uplink radio channels, or incoming signals from wire-bound subscribers, to a downlink radio channel effectively creates half-duplex radio channels in a full-duplex cellular mobile radio system, which half-duplex channels can then be used for group calls first as in a trunked mobile radio system. In this manner it is no longer necessary to use two co-existing networks, because the radio channels necessary for the two networks can be selectively used, depending on the need, as full-duplex or half-duplex channels.

It is furthermore advantageous that by merely providing appropriate coupling means, a trunked mobile radio system can be created from an existing mobile radio system with little further circuitry and cost.

BRIEF DESCRIPTION OF THE DRAWING

The invention will now be further described and explained with reference to embodiments and the drawings, in which:

FIG. 6a shows a time-division multiplex frame diagram for a GSM half-rate channel;

FIG. 6b shows a time-division multiplex frame diagram for a group traffic channel.

FIG. 6c shows a time-division multiplex frame diagram for a group control channel.

DESCRIPTION OF THE PREFERRED EMBODIMENTS

Figure 1:
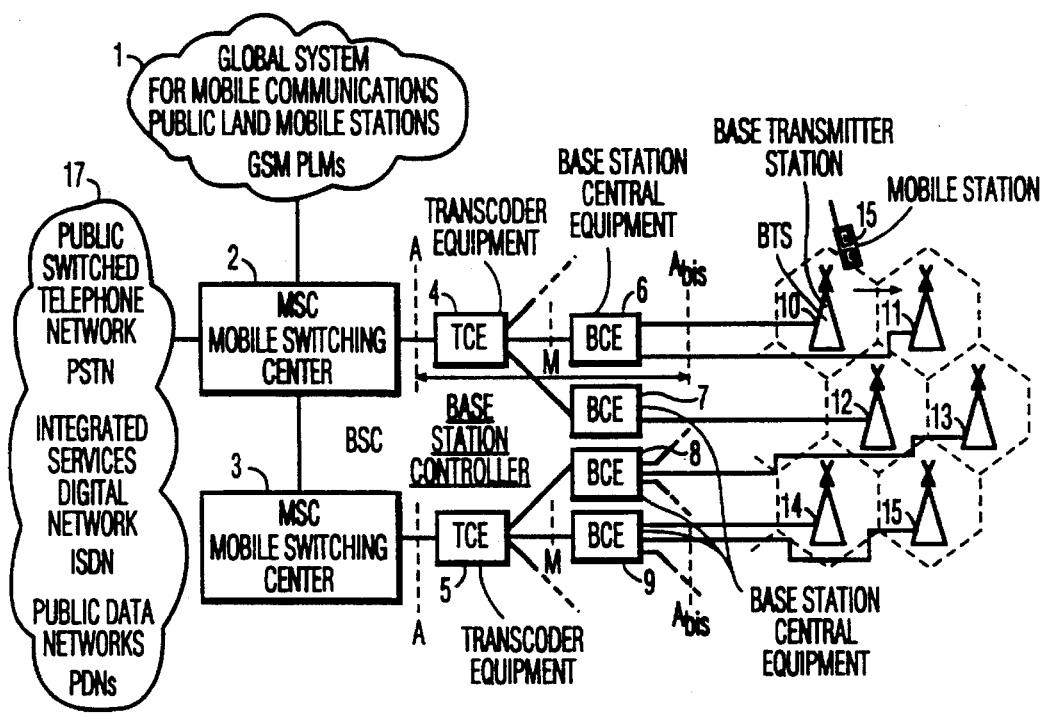
FIG. 1 is a diagram of a cellular mobile radio system.

FIG. 1 is a diagram of a cellular mobile radio system, in accordance with the GSM system (Global System for Mobile Communication) used in Europe. A survey of this mobile radio system is found, for example, in EP 0 544 457. Since the GSM network is sufficiently known to those skilled in the art, the it is discussed in the description of this invention only insofar as necessary for understanding the invention. On the other hand, the invention is obviously not restricted only to the GSM network, but is also suitable for other cellular mobile radio systems in which duplex links are used.

The framework of the GSM network is formed by Mobile Switching Centres (MSC) which are interconnected via data lines. The mobile switching centre MSC is a digital switching centre having a high power capability which provides the transition between the GSM network and other telecommunication networks, such as, for example, and the Public Switched Telephone Network (PSTN), the ISDN network, and also manages the GSM network. One or a plurality of Base Station Controllers (BSC) is/are connected to each Mobile Switching Centre (MSC). The base station controller BSC manages one or a plurality of Base Transceiver Stations (BTS), each base transceiver station BTS covering a radio cell. For establishing the necessary links between the mobile switching centre MSC and each base transceiver station BTS, each base station controller BSC comprises a further switching matrix.

The transition from the mobile switching centre MSC to the base station controller BSC is standardized as a so-called A-interface. The A-interface provides the known PCM30-format as a data format, so that conventional PCM30-transmission links can be used for data transmission. The PCM30-signal is a time-division multiplex signal in which 30 data signals, for example, digitized telephone signals having a data rate of 64 kbits/s, are combined to form a bit stream of 2.048 Mbits/s. For this purpose, the PCM30-frame is subdivided into 32 time slots of 8 bits each. The first time slot (number 0) comprises an identification of the beginning of the frame, the $17^{th}$ time slot (number 16) is used for transmitting signals of the data channels accommodated in the remaining 30 time slots.

The first stage of establishing the GSM system is speech coding, in which a 260-bit-long data block is formed, based on the known technique of Linear Predictive Coding (LPC), linked with a Long-Term Prediction (LTP) and a coding of the residual signal with a pulse sequence with a Regular Pulse Excitation (RPE) for speech samples each 20 ms in length. This corresponds to a data rate of exactly 13.0 kbits/s. In the wire-bound telephone network, on the other hand, a Pulse Code Modulation (PCM) with a data rate of 64 kbits/s is customary for transmitting speech signals in digital form. For converting PCM signals into GSM signals, and vice versa, TransCoder Equipment (TCE) is arranged at the A-interface. The combination of 260 bits of a 20 ms speech sample will be referenced net bits hereinafter, because they do not contain any further information. These net bits are extended by additional control bits and unassigned bits to a total 320 bits and form a so-called TRAU frame (TRAU= Transcoding Rate Adaptation Unit). The data rate of the TRAU frame is thus exactly 16 kbits/s.

In an extension of the GSM network, speech data having a comparable speech quality are alternatively intended to be coded at only half the data rate. When such half-rate data channels are used, the transmission capacity, especially on the radio transmission path of the GSM network, can be doubled. Since final agreement on the coding method to be used has not yet been establish, in the following the transmission of full-rate data channels will be described.

Although the transcoder equipment TCE is a logical element of the base station controller BSC, it is accommodated in the mobile switching centre MSC concerned. At the so-called M-interface of the transmission link between the transcoder equipment TCE and the Base Station Central Equipment (BCE), not more than a quarter of the transmission capacity is necessary in this manner, because in each PCM30-channel having 64 kbits/s, four TRAU signals can be accommodated with 16 kbits/s. Since the distance between the mobile switching centre MSC and the base station central equipment BCE may be several 100 km, transmission costs can be saved in this manner.

Figure 2:
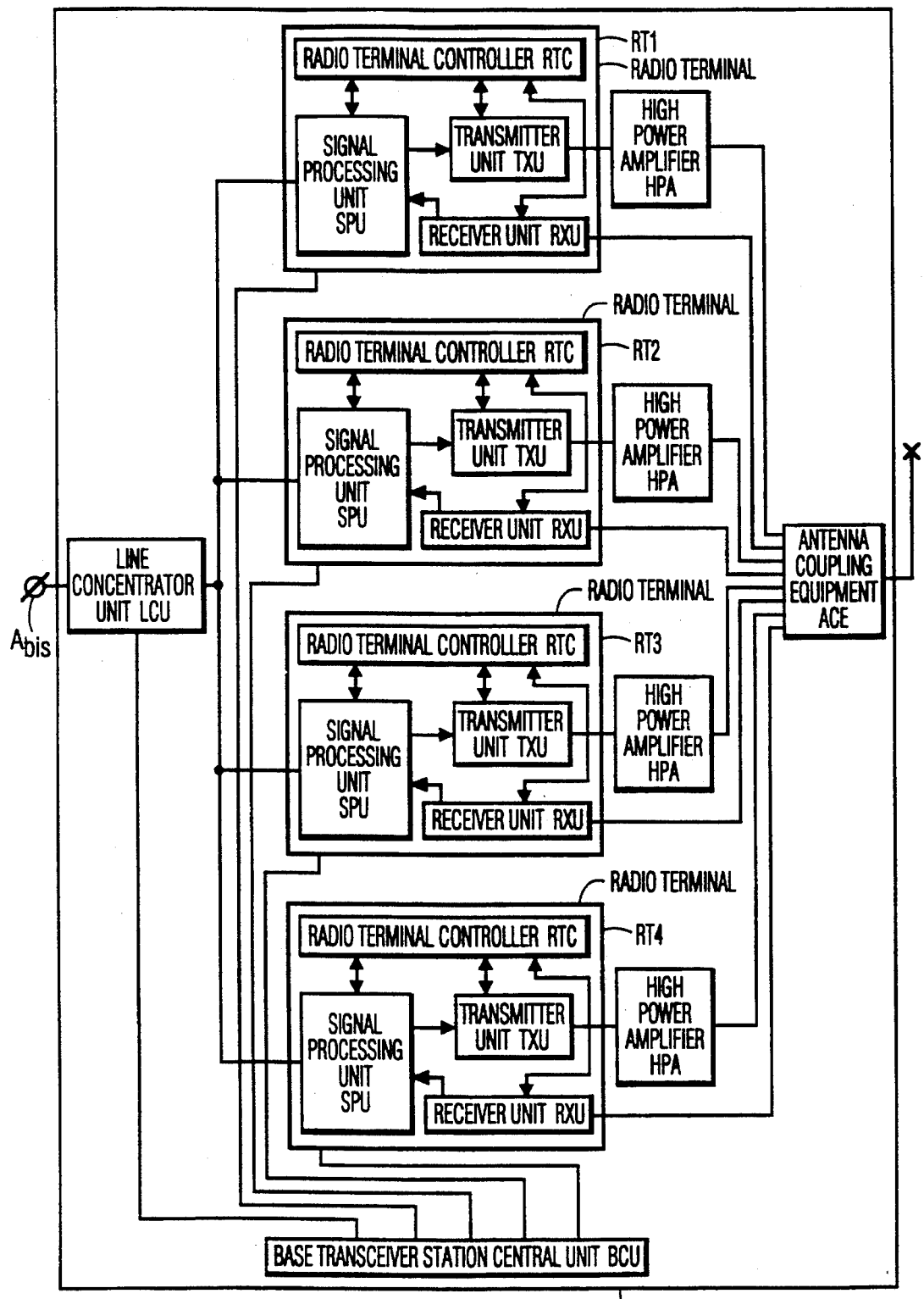
FIG. 2 is a block diagram of a base transceiver station BTS.

For data transmission between the base station central equipment BCE and the individual base transceiver station BTS (so-called $A_{bis}$-interface), them is also a PCM30-frame available in which logical sub-channels are formed within the PCM30-frame, so that for each traffic channel there is a transmission capacity available of 16 kbits/s FIG. 2 shows the diagrammatic structure of a base transceiver station BTS. In a Line Concentrator Unit (LCU), useful signals and control signals found in the data stream coming in via the $A_{bis}$-interface are separated. The useful data are distributed over individual Radio Terminals (RT) RT1 ... RT4 via an internal data bus of the base transceiver station BTS, each radio frequency having its own radio terminal RT. Since the GSM system is designed as a TDMA system having eight time slots for each frequency, a radio terminal RT can make eight transmission channels available. A Signal Processing Unit (SPU) arranged in the radio terminal RT encodes time-slot send signals from the useful data, which signals are modulated in the Transmitter Unit (TXU) on a HF carrier generated in the transmitter unit and are optionally brought to an appropriate output transmit power in a High Power Amplifier (HPA). The signals to be transmitted from all the radio terminals of a base transceiver station are combined to a single transmit signal by Antenna Coupling Equipment (ACE).

Signals received from the antenna are frequency selected in the Receiver Unit (RXU) of the radio terminal RT and converted to complex, digital baseband signals. The baseband-converted signals are decoded in the signal processing unit SPU and combined to a continuous data flow and transmitted via the internal data bus, the coupling concentrator and the $A_{bis}$-interface to the BCE.

For generating a central clock signal, each base transceiver station furthermore comprises an internal controller BCU (BTS Central Unit).

Figure 3:
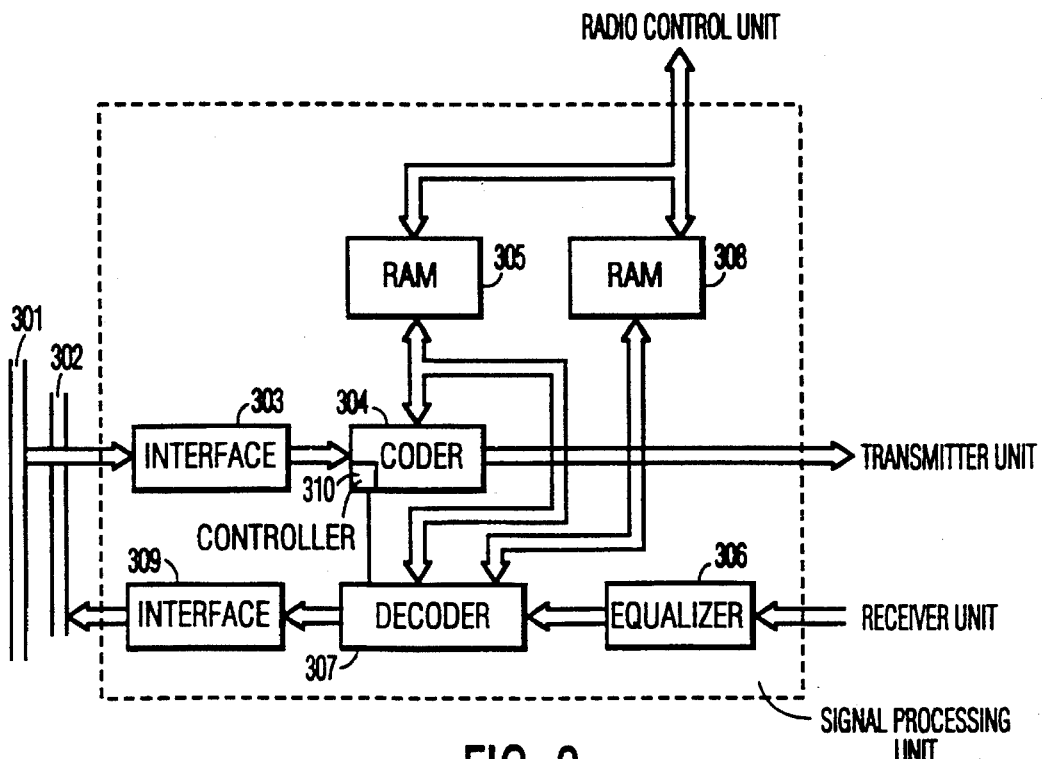
FIG. 3 is a block diagram of a signal processing unit SPU for the base transceiver station BTS.

FIG. 3 shows the basic circuit diagram of the signal processing unit SPU in FIG. 2. The internal data bus of the base transceiver station BTS is formed by a first data bus 301, which conveys the data arriving over the $A_{bis}$-interface, and a second data bus 302, which conveys the data leaving through the $A_{bis}$-interface. A coder 304 inserted into the signal processing unit SPU controls a first interface 303, so that the data intended for a specific radio channel are taken over by the internal data bus 301. The data that have been taken over are temporarily stored by the coder 304 in a first memory 305 in accordance with the respective radio channels i.e. in accordance with the time slot in which they are to be transmitted. For this purpose, the useful data still included in the TRAU frame are extracted. The 260 bits of a 20 ms speech sample receive additional bits for error recognition from the coder 304 and are extended to a total of 456 bits by a convolutional code, as a result of which they are made highly error-resistant. Eight sub-blocks of 57 bits each are formed from these 456 bits. In each time slot a sub-block of a TRAU frame and a corresponding sub-block of the next TRAU frame are transmitted, so that each time after eight TDMA frames a total of two TRAU frames are transmitted. This interleaving divides the gross bits of a 20 ms speech sample into eight consecutive TDMA frames, so that the signal becomes less sensitive to brief interference and the consequent delay in the transmission does not become too large. Similarly, signalling data having a net length of 184 bits are also transmitted with a gross length of 456 bits.

To form the time slot signal, the coder adds between the sub-blocks of 57 bits a training sequence which comprises a specific bit sample of 26 bits, as well as two further signalling bits (stealing flags) and, at the beginning and end of the time slot signal, three more header bits and end bits. The data block of 148 bits formed in this manner for each of the eight time slots is transmitted to the transmitter unit TXU by the coder 304.

The received signals convened to the baseband by the receiver unit RXU are converted to sample values in an equalizer 306 for each bit to be decoded. A decoder 307 calculates from these sample values the received data blocks for each time slot, de-interleaves the sub-data blocks and assembles a TRAU frame from them. The calculated TRAU frames are temporarily stored in a second memory 308, so that these TRAU frames are transmitted on time via a second interface controller 309.

Signalling data are additionally needed to transmit the speech data. In the GSM system these signalling data are organized also in a time-division multiplex mode in different logical channels, so-called control channels, which, depending on the function, completely occupy a physical channel, or make use of the same physical channel as the speech data when there is an accordingly lower data transmission rate. In the following a survey will be given of the most important control channels of the existing GSM system to explain later on in this description the additionally proposed control channels which are advantageous for group calls.

Each base transceiver station sends out various system information signals over the broadcast channel (BCCH). The BCCH is solely needed in the direction from the base station to the mobile station, in the so-called downlink. By means of the system information sent over the BCCH, each mobile station located inside the radio cell of the base transceiver station concerned is enabled to establish a connection to its associated base transceiver station. For example, the system information of the BCCH comprises the frequency of a Random Access Channel (RACH) operating only in the direction from mobile station to base station, the so-called uplink, on which a mobile station can claim a channel which is then made available to the mobile station solely for bidirectional use. The claimed channel is taken from a radio channel list stored in the base transceiver station and is announced to the mobile station via the BCCH in a so-called immediate assignment message. Generally, the assigned channel is first used as a Stand-alone Dedicated Control Channel (SDCCH) in both directions and exclusively for exchanging data. If a call link-up is made, the selected channel is used in the time-division multiplex mode as a Traffic Channel (TCH) and for signalling purposes during a traffic link as a Slow Associated Control Channel (SACCH).

FIG. 6a shows the time-division multiplex diagram for two traffic channels H1, H2 which are arranged as half-rate data channels. In this time-division multiplex diagram a control channel time slot A1, A2 respectively, is contained in the time-division multiplex frame diagram for each twelve traffic channel time slots H1, H2 respectively. The information of the SACCH concerned is transmitted in these control channel time slots A1 and A2.

To ensure undisturbed operation of a call, it is possible in the GSM system for a mobile station to divert to another frequency within a cell (intracell handover) or to change to another cell (intercell handover). To judge its radio situation, a mobile station continuously sends out over the SACCH measurement reports which contain data about its own cell and about adjacent cells.

For this purpose, each mobile station is informed over the SACCH of the frequencies of the BCCHs of the adjacent base transceiver stations. The time-division multiplex frames of the GSM system are structured in such a way that they also contain time slots occupied neither by a traffic channel nor by a control channel. In these time slots the receiver of the mobile station is tuned to the BCCHs of the adjacent base transceiver stations and measures the signal strength of the adjacent base transceiver stations. The measured signal strengths are transmitted to the base transceiver station over the SACCH. Furthermore, in the GSM system the signal strength and the bit error rate of the selected channel are measured by each mobile station and also transmitted to the base transceiver station over the SACCH.

For forming group calls in a radio system, which system is to enable both duplex calls between two subscribers or duplex links among a plurality of subscribers in the case of a conference circuit, and group calls in the half-duplex mode, the same duplex link is provided for the coupling of the uplink radio channel of the duplex link with the downlink radio channel. In the preferred embodiment this coupling is realised by appropriate programming of the signal processing unit SPU. In the coupling mode all the TRAU frames received from the decoder 307 for the radio channel arranged as a group channel, in lieu of the TRAU frames received from the base station controller BSC, are transmitted as the next TRAU frames from the coder 304 to the transmitter unit. This operation needs only an appropriate storing operation in which the TRAU frame blocks stored in the second memory 308 are copied to the storage area of the first memory 305 in the position in which generally the TRAU frame blocks received from the base station controller BSC are located for a duplex link. In this manner the coder 304 uses the copied TRAU frames for transmission.

In this embodiment a group call is limited to the transmit and receive area of a base transceiver station. For example, in FIG. 1 this corresponds to the area of cell 10. This is appropriate for locally limited group calls, which are necessary only within a locally limited small area. Since the radio cell can be widened in GSM, for example, to a radius of about 37 km, still a relatively large area can be reached by means of group radio. Typical examples for the use of such one-cell group radios are a taxi radio within the large cell of a city, but also group calls within a small radio cell, for example, the conversation between shunters within the strictly limited blanket coverage of a railway station.

The advantage of the invention is also found in that, basically, each already available base transceiver station can be used for handling group calls, but also that the location of a new base transceiver station can be arranged in accordance with the local requirements of the planned group calls. A base transceiver station located in this manner is primarily used for handling group calls, but may, in the second place, also be used as a network supplement for normal duplex links. But there is an increasing problem of finding additional locations for the base transceiver station or for the antenna. In this manner a location comprising only one hardware version can be used both for the conventional use of mobile radio and for group calls.

A group may then be formed by two subscribers or a plurality of subscribers. The special feature is the half-duplex mode i.e. that always only one subscriber is active and transmits information, whereas the other subscribers are passive i.e. do not transmit but only receive.

For activating a subscriber, each mobile radio set may comprise, for example, a switch (push-to-talk button) which is to be depressed by the user as long as he wishes to send a message over the group channel.

Figure 4:
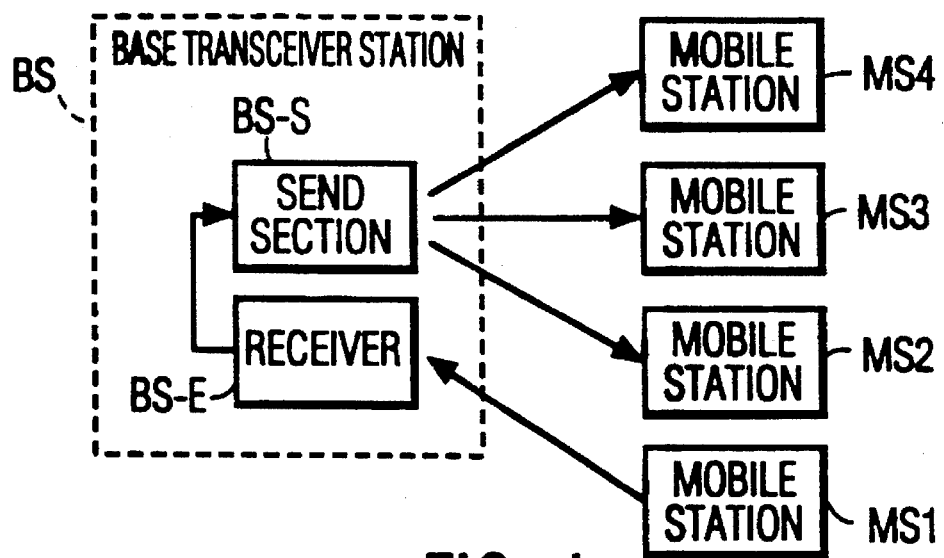
FIG. 4 shows the signal flow in a base transceiver station and between the base transceiver station and mobile stations for a group call within the send and receive coverage area of a single base transceiver station.

In FIG. 4 the group is formed by the mobile stations MS1, MS2, MS3 and MS4. They use a channel of the base transceiver station in common as a "group channel", whereas normal traffic (for example, according to the GSM standard) is handled on the other channels of this base transceiver station. In FIG. 4 the mobile station MS1 is active and is transmitting to the base transceiver station BS.

The base transceiver station receives in the receiver BS-E the signal from the mobile station MS1, processes this signal, conveys the received information to its send section BS-S and retransmits the signal. If, in the transmit mode, sending and receiving take place separately because of frequency, time or code-division multiplex, the mobile station MS1 can again receive the transmitted signal and ascertain whether its signal has been accepted by the base transceiver station. This is possible in GSM.

Figure 5:
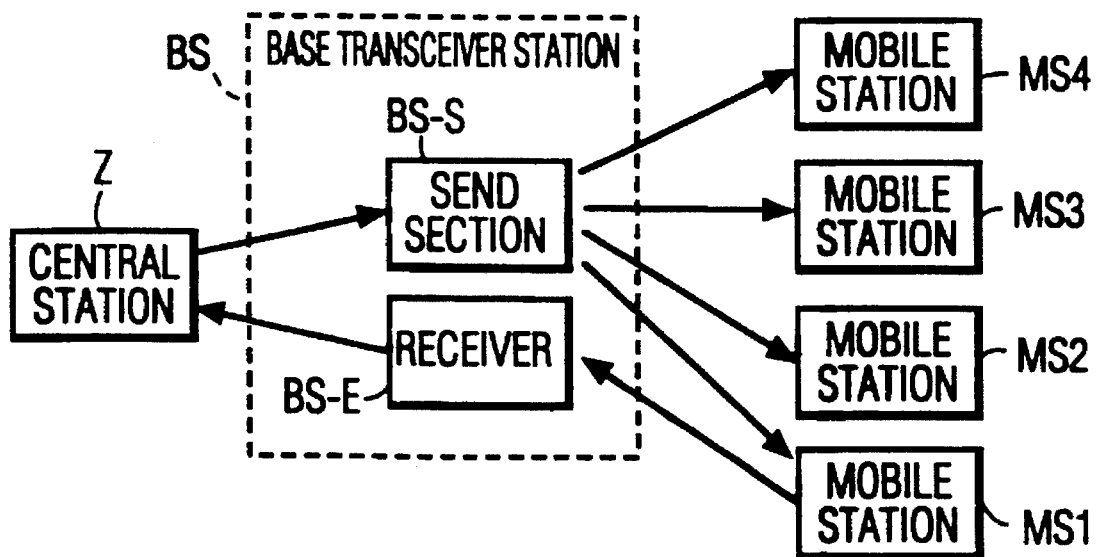
FIG. 5 shows the signal flow between a base transceiver station and a switching centre and mobile stations during a group call, which call reaches beyond the send and receive coverage area of a plurality of base transceiver stations.

In another configuration the communication takes place between a central station Z and the group of mobile stations, cf. FIG. 5. In this case a duplex link to the active mobile station MS1 is possible. The mobile stations MS2, MS3 and MS4 are passive and in this case only hear the central station and not the mobile station MS1.

The central station may be a base transceiver station, so that no interventions in the existing mobile radio system are necessary. The coupling means can thus be inserted only in such a central station, while the loop between uplink and downlink channel is formed in the central station by coupling the incoming call to the outgoing call.

This kind of operation may also be performed in the half-duplex mode with the loop in the base transceiver station. In that case the mobile stations MS2, MS3 and MS4 can hear both the central station and the mobile station MS1.

The operation for a group can be extended to a plurality of channels in the same or in a different cell. For that purpose, these channels can be combined in a switching arrangement, for example, by means of conference circuits.

If these conference circuits are arranged at a mobile switching centre, it is possible in this manner to expand the group radio to the whole coverage area or, depending on the need, also only partially to the area of a mobile switching centre. This leaves unimpaired the advantage that within a cell not more than one duplex channel is necessary for the whole group.

Handovers between such channels are possible if the handover command is addressed to one, to a plurality of or to all the mobile stations.

If the base transceiver station sends out information over arranged group channels, the mobile stations can, in response to this information, select a cell in which group calls are possible or in which even a group call is arranged for the desired group.

The call can be established in the normal fashion i.e. the mobile station sends out the message of "channel request" and is assigned an individual channel by the network via the message of "immediate assignment". Then the identification, authentification and encoding may follow. If the group call is coded with a group code, this group code can now be announced to the mobile station safe from interception. The network assigns the group channel of the desired group to the mobile station.

The second possibility for establishing a call is that the network sends out information about group calls and that the mobile station directly accesses the group channel of the desired group on the basis of this information.

In the following the method will be further elucidated. Two alternatives are to be described which are to be distinguished as to their channel organization.

1. Group calls in the half-duplex mode, without permanent associated control channels (ACCH) or dedicated control channels (DCCH).

If the mobile station has been assigned the desired group channel, it continuously listens in on the channel for information, for example, speech, data or in-band signalling.

If the mobile station itself wishes to send out information, it waits until the channel is free and then first sends out a brief message (for example, as in GSM Recommendation 04.08 "handover access"), which may contain a reference to the identity of the accessing mobile station. In the case of collisions with mobile stations of the group accessing simultaneously, the attempt may be repeated by the mobile station at certain intervals which are to be calculated.

If the access attempt is recognized, the network sends out a message to the mobile station, which contains, for example, references to the identity and an indication about the send instant to be selected. Once this message has been received from the network, the mobile station carries out the necessary control commands (for example, renewed setting of the range-dependent send instant or send power) and sends out its information.

This information is received and processed by a group control unit which is integrated in the base transceiver station or can be reached via the network. Useful signals are retransmitted, after they have been recoded, as required, and distributed over the participants of the group.

When the sending mobile station has transmitted all the information, it terminates the link. This may be effected without further signalling. By sending a send termination message, the channel throughput can be increased, because a waiting mobile station can immediately seize the channel once it has received the send termination message reflected by the network.

The ACCH belonging to the traffic channel can verify all the functions used for maintaining the link between the currently transmitting mobile station and the network (for example, control of the range-dependent send instant or send power for the duration of this transmission.

A handover of a mobile station to an appropriate group channel in a new cell is possible during the interval in which a current transmission is taking place. On the other hand, the mobile station may also itself carry out a handover when it obtains information about other cells from the network. The mobile station can then autonomously assign its most favourable cell.

If it is necessary to monitor the participants of a group, for example the base transceiver station can request the subscriber sets to send out messages certain intervals apart.

2. Group calls in the half-duplex mode with associated control channels (ACCH) or dedicated control channels (DCCH).

Another possibility to realise the group calls will be described hereinafter with reference to a GSM system (GSM-900 or DCS-1800).

A feature of the normal operation of the duplex traffic channels in GSM is the associated control channel ACCH assigned to each traffic channel, in which associated channel the mobile station transmits measurement information (for example, receiving level and receiving quality of the adjacent channels) in the uplink direction (mobile to base transceiver station), and in the opposite direction, in addition to general system information, also commands for controlling the send instants and the send power are transmitted to the mobile station. This ACCH has $\frac{1}{26}$ of the traffic capacity for full-rate traffic channels and $\frac{1}{13}$ of the traffic capacity for half-rate traffic channels (compare FIG. 6a).

The invention proposes to make available for group calls one group traffic channel GTCH (see FIG. 6b) and at least one group control channel GCCH (see FIG. 6c). It should be considered that for a customary mobile station no conflicts may arise caused by the simultaneous operation of GTCH and GCCH. In GSM this is impossible, because two complementary half-rate sub-channels are used. In FIG. 6b G is a frame of the group traffic channel used in common by MS1 ... MS12, and H1, X are unused frames. FIG. 6c the frames A1, ... A12 are frames of the associated control channels assigned to MS1, ... MS12, and Y is an unused frame or an optional ACCESS channel. The frame structure is identical both in the direction of an uplink and a downlink.

The GTCH in an uplink is shared by all the participating mobile stations, but, at a particular instant, only by a single mobile station. The useful information received by the network via the uplink is distributed over the connected GTCHs in the direction of a downlink by a control unit RTC in each radio terminal as shown in FIG. 2. This may entail a recoding, for example, of signalling messages or speech signals.

The assigned GCCHs are operated according to the full-duplex method and distributed by a multiplex method to the mobile stations taking part in the group, so that they can each take over the usual role of ACCH for a full-duplex link, for example, for transmitting measurement information in the uplink and control information in the downlink.

This makes it possible for a GCCH based on the GSM half-rate channel to check 12 mobile stations. If necessary, a plurality of GCCHs per group can be made available.

The advantage of this method is that, as a result of the continuous monitoring of the participating links, the mobile stations always have the correction value for the send instant necessary for sending and, as a result, the use of the GTCH in the uplink does not require a shortened access. The channel can forthwith be seized for sending out useful information when the channel has been recognized as free by the mobile station. In the case of collisions caused by multiple access, which are recognized by the control unit in the network or by the mobile stations themselves, the mobile station can make access attempts certain calculated distances in time apart.

A further advantage of this method is that individual group calls can be handed over to adjacent cells by the network, as required, if in the adjacent cell the necessary group channels are available. This is possible, in principle, when signalling messages are used over the sub-channels operated as ACCH, but may also be supported, for example, if the GCCH makes additional signalling channels available in addition to the ACCH, (for example, SDCCH in GSM) or with in-band signalling (for example, FACCH) on the traffic channel.

A variant of the invention is that ACCH originally available in the GCCH (as a traffic channel) and unused sub-channels are used for controlling the access. This additional duplex channel will henceforth be referenced access channel. A mobile station requesting the assignment of the uplink GTCH, sends a message signalling the request for access over the access channel and making it possible for the network to assign the GTCH in a purposeful manner. This may be effected in that a message derived from the request for access is sent back over the downlink of the access channel or over the downlink of the (GCCH-)ACCH concerned to the mobile station.

We claim:

1. A cellular radio communication system comprising a plurality of base stations respectively for respective regional cells and wherein for communicating with a plurality of mobile user stations in any particular cell the base station for said cell provides down-link radio channels for transmission from the base station to mobile user stations and up-link radio channels for transmission from mobile user stations to the base station, the up-link and down-link channels being paired so as to establish a duplex channel for any mobile user station with which communication is to be established with the base station; a common radio signalling channel also being provided between the base station of a cell and mobile user stations therein in order to provide for exchange of control information and channel assignments; characterized in that said system is adapted to be selectively converted into a trunked radio communication system which provides a common group channel for transmission of a one-way group call from a requesting mobile user station to a specified group of other mobile user stations, said selectable conversion being provided by programmable control means (RTC) comprised in each base station and which in response to a group channel request from a requesting mobile user station couples the up-link channel of said requesting station to a common group channel assigned as a down-link channel to each of a group of mobile user stations specified in the group channel request.

2. A system as claimed in claim 1, wherein a mobile user station engaged in a group call also maintains, in addition to communication over the common group channel, a radio communication link with the relevant base station over said signalling channel.

3. A system as claimed in claim 2, wherein in order to initiate a group call over the common group channel the requesting mobile user station sends over said signalling channel an access message containing data necessary for coordinating transmission of information over the common group channel to said group of other mobile user stations.

4. A system as claimed in claim 2, wherein in order to initiate a group call over the common group channel the requesting mobile user station first transmits an access message over said signalling channel and the relevant base station coordinates concurrent access messages from different requesting mobile user stations and transmits access authorizations over the common group channel which avoid collisions between group calls from the different requesting mobile user stations.

5. A system as claimed in claim 1, wherein information is transmitted in the radio channels in the form of time-division multiplex signals.

6. A system as claimed in claim 1, wherein in order to initiate a group call over the common group channel a requesting mobile user station sends out brief access messages, the relevant base station analyzes and processes access messages according to at least one of time of arrival and message content, and the requesting mobile user station transmits over the common group channel data necessary for coordinating transmission of information over said channel to said group of other mobile user stations.

7. A system as claimed in claim 1, wherein in order to initiate a group call over the common group channel the requesting mobile user station waits until the group channel is established, then transmits thereon brief access messages, then awaits reception of a return message from the relevant base station indicating access authorization for the group channel, access and send instants, and send power.

8. A system as claimed in claim 7, wherein a requesting mobile user station which has transmitted an access request message over the common group channel waits a predetermined time interval for acknowledgement from the relevant base station, and then repeats the access request message if said acknowledgement is not received within said time interval.

9. A system as claimed in claim 1, wherein after a requesting mobile user station has completed transmission of information over the common group channel said mobile user station releases the common group channel without further signalling.

10. A system as claimed in claim 1, wherein several common group channels are formed which are connected to each other by the relevant base stations, thereby increasing the coverage area of the trunked radio communication system.

11. A system as claimed in claim 1, wherein each base station comprises a control unit for controlling assignment of channels to mobile user stations and which, when a common group channel is to be established for a group of mobile stations, assigns said group of mobile stations to the common group channel.

12. A system as claimed in claim 1, wherein a requesting mobile user station transmits an access request message which is encoded with codes identifying mobile user stations to be included in a group call.

13. A system as claimed in claim 12, wherein mobile stations to be included in a group call directly assign themselves to the common group channel in response to transmitted group call data, whereby call set-up and handover procedures are avoided.

14. A system as claimed in claim 1, wherein mobile user stations to be included in a group call assign themselves to a cell in response to group call control data transmitted by the base station of said cell.

* * * * *